A. ST. ONGE.
GRIDDLE GREASER.
APPLICATION FILED APR. 24, 1919.
1,335,998.
Patented Apr. 6, 1920.
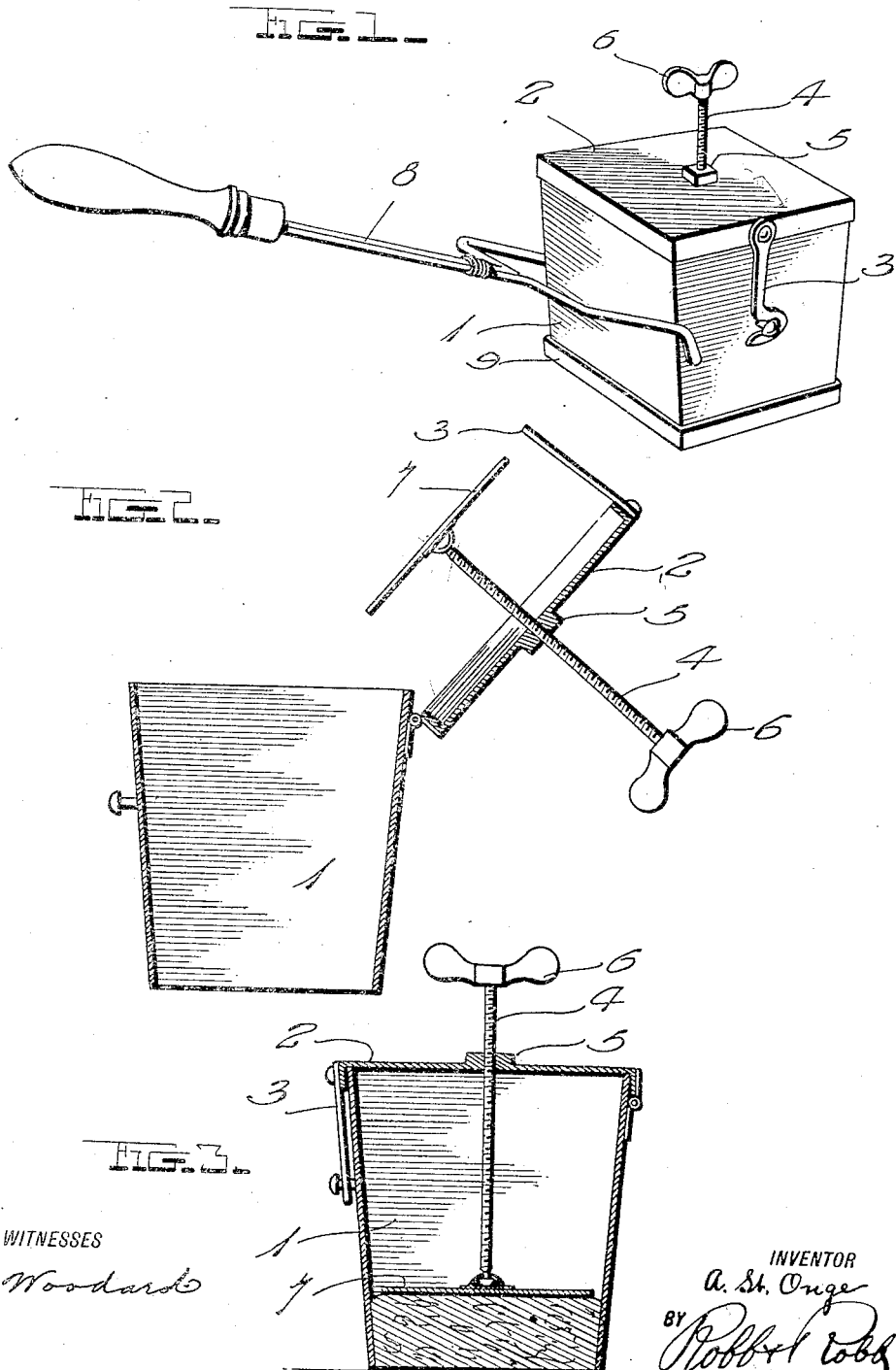
WITNESSES
H. Woodard
INVENTOR
A. St. Onge
BY
Robb & Robb
ATTORNEYS

UNITED STATES PATENT OFFICE.

ALEXANDER ST. ONGE, OF SHEFFIELD, MASSACHUSETTS, ASSIGNOR OF ONE-HALF TO MARY ISABELLE THOMSON, OF SHEFFIELD, MASSACHUSETTS.

GRIDDLE-GREASER.

1,335,998.  Specification of Letters Patent.  Patented Apr. 6, 1920.

Application filed April 24, 1919. Serial No. 292,383.

*To all whom it may concern:*

Be it known that I, ALEXANDER ST. ONGE, a citizen of the United States, residing at Sheffield, in the county of Berkshire and State of Massachusetts, have invented certain new and useful Improvements in Griddle-Greasers, of which the following is a specification.

The present invention has to do with improvements in culinary articles, the object in view being to provide a thoroughly sanitary, greasing device for griddles or the like.

In carrying out the invention my idea has been to provide a simple holding device for the grease material which may readily be manipulated, and which is so constructed as to permit the contents of the holder to be renewed from time to time, as well as to be completely used, said material, however, being adapted to be entirely covered so as to prevent contamination when not in use.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a perspective view of a device constructed in accordance with this invention;

Fig. 2 is a vertical section, showing the cover of the container in open position; and Fig. 3 is a sectional view through the holder, cover closed and plunger coacting with the contents.

Throughout the following detail description and on the several figures of the drawings, similar parts are referred to by like reference characters.

Referring to the drawing, 1 designates the body portion of the holder which is, in this embodiment illustrated, of frusto-pyramidal form, though it is to be understood that I do not wish to be restricted to the particular shape referred to. At the top, or the enlarged end of the holder body, is hingedly mounted the cover 2, a suitable fastening device or hook 3 being provided for locking the cover or lid in its closed position. This cover carries a plunger or pressure device which consists of the threaded stem 4, having threaded connection with the lid at 5 and a finger piece 6 for rotating the same. At its lower extremity a rectangular plate 7 is swiveled and this is designed to be moved against the material which is introduced into the holder to press said material toward the smaller end of the holder.

At one side is provided a suitable handle 8 for manipulating the device. A removable cover 9 is designed to be placed upon the lower end to inclose the contents of the body 1, so as to prevent access of dust when the device is not in use.

In the use of the article the grease skin or other greasing material is inserted within the body of the holder 1 by opening the lid 2, the plunger being retracted to its uppermost position. The lid is then closed and locked in the closed position, whereupon the plunger is screwed inwardly or downwardly so as to press the contents toward the smaller end of the holder until a small portion of the grease material projects from this end, it being understood that the cover 9 at this end is removed. The particular or tapering shape of the holder is advantageous in that it tends to prevent the complete expulsion of the contents when the plunger is pressed against the grease material but as the surface of said material is removed by the greasing operation the plunger is further operated to move the contents outwardly of the bottom opening, in an obvious manner.

A device constructed in accordance with the above is very useful and economical in that the contents of the holder can be used up completely and said contents may readily be replenished from time to time as required. The mounting of the plunger upon the cover is advantageous since the opening of the cover or lid 2 displaces the plunger from the holder at the same time, making the replenishment of the contents a very simple operation. After the use of the device the cover 9 may be placed over the smaller end to protect the projected surface or the contents of the holder as will be clear from the foregoing description.

Having thus described my invention, what I claim as new is:

A griddle greaser comprising a rectangular body having its lower end open, a handle attached to the body, a lid hingedly connected to the body at its upper end, catch means for holding the lid in closed position, a pressure plunger mounted upon said lid and having a threaded stem having threaded connection with said lid, a finger piece at one end and a presser plate swiveled at its other end, the body aforesaid tapering toward its lower open end and thereby tending to resist discharge of the contents by the plunger, and detachable closure means for the lower end of the body constituting a protective cover for the surface of the contents when not in use.

In testimony whereof I affix my signature.

ALEXANDER ST. ONGE.